UNITED STATES PATENT OFFICE.

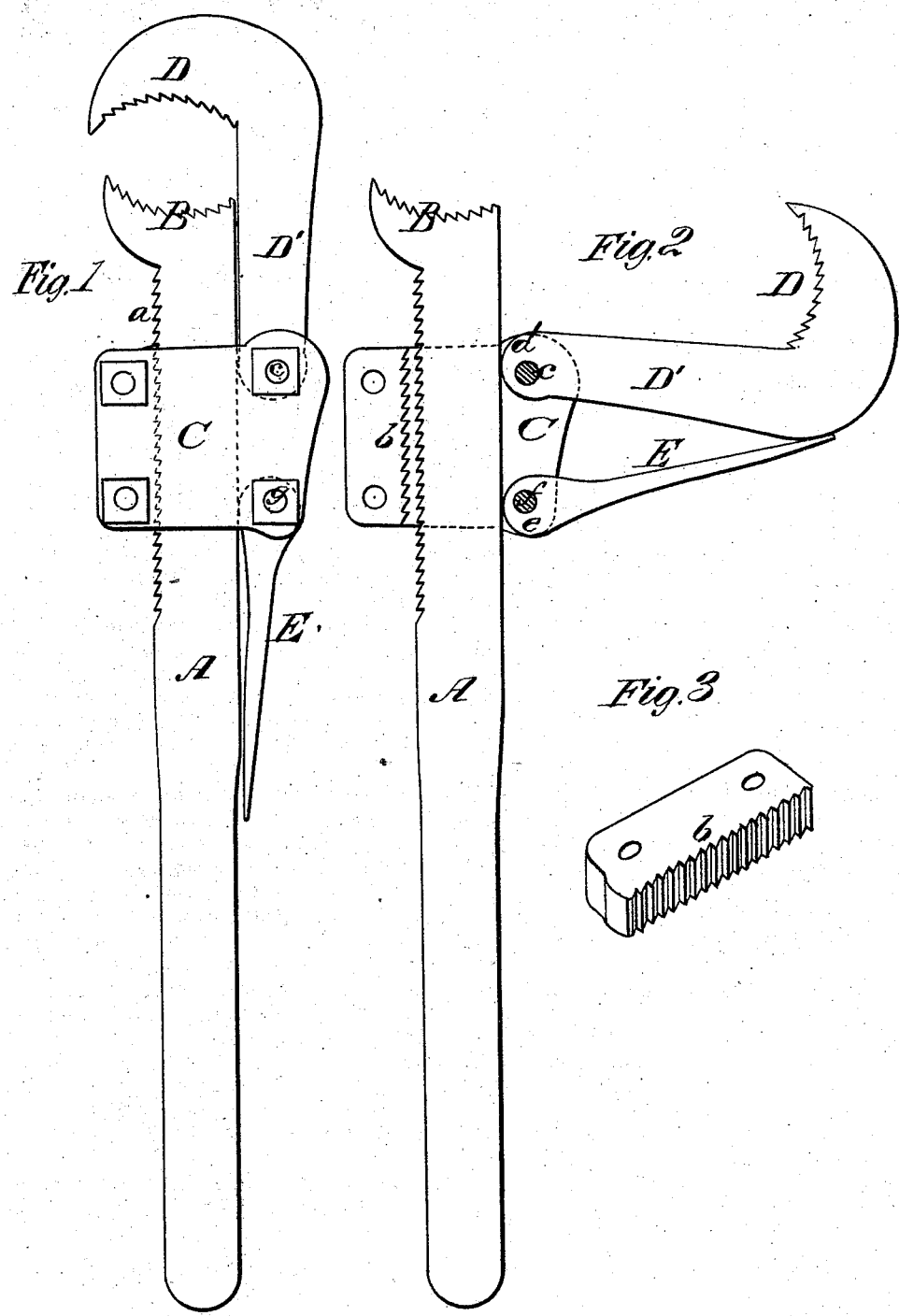

JAMES BEDMAN, OF WINNIPEG, CANADA.

IMPROVEMENT IN PIPE-WRENCHES.

Specification forming part of Letters Patent No. 155,485, dated September 29, 1874; application filed September 14, 1874.

*To all whom it may concern:*

Be it known that I, JAMES BEDMAN, of Winnipeg, in the Province of Manitoba and Dominion of Canada, have invented a new and valuable Improvement in Pipe-Wrenches; and I do hereby declare that the following is a full, clear, and exact description of the construction and operation of the same, reference being had to the annexed drawings making a part of this specification, and to the letters and figures of reference marked thereon.

Figure 1 of the drawing is a representation of a side view of my pipe-wrench. Fig. 2 is a sectional view of the same. Fig. 3 is a detail view of the same.

This invention has relation to wrenches having a griping-jaw and a pivoted griping-claw. It consists in a serrated handle having a double griping-slide on it, in combination with a cam-lever and a griping-claw, the shank of which is pivoted to said slide in such manner that when the claw is in a position for griping a bar or a pipe its shank will aid the cam-lever in rigidly fixing the slide to its handle, as will be hereinafter more fully explained.

In the annexed drawings, A designates the handle of the wrench, which may be of any suitable length, and which has serrations $a$ formed on one edge; also, a curved and serrated griping-jaw, B, formed on one end. C designates a clasping-slide, which is composed of two flat plates and a serrated block, $b$, bolted together, and applied on the handle A. The teeth on block $b$ are pitched in an opposite direction to the pitch of the teeth $a$ on handle A, as shown in Fig. 2, so that when the teeth are engaged, as shown in Fig. 1, slide C is rigidly secured to its handle. By my improvement the teeth can be made very small, for allowing very nice adjustments of the slide C to be made. D designates a curved griping-claw, the teeth of which are pitched opposite to the pitch of the teeth of jaw B. This claw is formed on a shank, D', the end of which is pivoted at $c$, and made cam-shaped, as shown in Fig. 2, so that when the claw is in the position indicated by Fig. 1, the teeth on the slide-block $b$ will be engaged with the teeth on handle A. E designates a cam-lever, having a cam, $e$, formed on one end, and pivoted at $f$ to the slide C.

When the claw and the cam-lever are adjusted as shown in Fig. 2, the slide C can be freely moved toward or from the jaw B, and when this slide is moved to the proper position it is rigidly held to its handle A by adjusting the claw and cam-lever, as shown in Fig. 1.

It will be seen that the claw is easily adjusted to pipes of different diameters, and to pipes varying very little in diameter; also, that when the instrument is adjusted to a pipe the latter can be rotated any number of times by simply vibrating the handle A.

It is obvious from the above that the instrument can be advantageously used as a "monkey-wrench" on hexagon or octagon nuts.

What I claim as new, and desire to secure by Letters Patent, is—

The serrated bar A, in combination with the slide C, provided with corresponding serrations, and secured by the cam-lever E, and cam pipe-hook D', substantially as shown and described.

In testimony that I claim the above I have hereunto subscribed my name in the presence of two witnesses.

JAMES BEDMAN.

Witnesses:
   H. C. HOLLINGSHEAD,
   FRANK J. MASI.